(12) United States Patent
Wirtanen et al.

(10) Patent No.: US 10,632,965 B1
(45) Date of Patent: Apr. 28, 2020

(54) VEHICLE INCLUDING THEFT RECOVERY AND THEFT DATA GATHERING FUNCTIONALITY

(71) Applicant: FORD GLOBAL TECHNOLOGIES, LLC, Dearborn, MI (US)

(72) Inventors: Jeffrey William Wirtanen, Kanata (CA); Muhammad Khaledul Islam, Ottawa (CA); Jin Kim, Ottawa (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/399,174

(22) Filed: Apr. 30, 2019

(51) Int. Cl.
*B60R 25/10* (2013.01)
*B60R 25/102* (2013.01)
*H04L 29/06* (2006.01)
*B60R 25/30* (2013.01)

(52) U.S. Cl.
CPC ............ *B60R 25/102* (2013.01); *B60R 25/30* (2013.01); *H04L 63/30* (2013.01)

(58) Field of Classification Search
CPC ...... B60R 25/102; G08G 1/161; G08G 1/205; G07C 5/008
See application file for complete search history.

(56) References Cited

U.S. PATENT DOCUMENTS

| | | | | |
|---|---|---|---|---|
| 8,558,678 | B2 * | 10/2013 | Van Wiemeersch | .... B60R 25/00 340/426.1 |
| 9,256,766 | B1 | 2/2016 | Newstadt et al. | |
| 2002/0190873 | A1 * | 12/2002 | Flick | ...................... B60R 25/04 340/988 |
| 2009/0309709 | A1 | 12/2009 | Bevacqua et al. | |

* cited by examiner

*Primary Examiner* — Toan N Pham
(74) *Attorney, Agent, or Firm* — Gregory P. Brown; Brooks Kushman P.C.

(57) ABSTRACT

A vehicle may offer a mobile device connection with the vehicle, the connection being to at least one of a simulated network connection or a simulated application connection, responsive to a stolen-vehicle trigger that is received by or detected by the vehicle. The vehicle may further gather predefined data from the mobile device, responsive to the mobile device accepting the offer and connecting to at least one of the simulated network connection or simulated application connection.

20 Claims, 2 Drawing Sheets

VEHICLE INCLUDING THEFT RECOVERY AND THEFT DATA GATHERING FUNCTIONALITY

TECHNICAL FIELD

The illustrative embodiments generally relate to methods and apparatuses for vehicles including theft recovery and theft data gathering functionality.

BACKGROUND

Vehicles that are stolen are becoming easier to recover, due to advances in tracking technology that provide coordinates and other information when a vehicle is stolen. Most of the technology, however, is designed to recover the vehicle and not to necessarily catch the thief, leaving the thief free to steal additional vehicles.

Unless the thief is present when the vehicle is recovered, there is a decreased likelihood of catching the thief, as the thief may have wiped down the vehicle of trace evidence, requiring law enforcement to rely on alternative means, such as local video surveillance, to try to identify the thief. This can be especially difficult if the vehicle is joy-ridden, meaning it was only stolen for the purpose of a brief ride, typically leaving little evidential trail and almost always ensuring the thief is long gone by the time the vehicle is recovered, as the thief may only be present in the vehicle for a matter of minutes.

SUMMARY

In a first illustrative embodiment, a system includes a processor of a vehicle, configured to offer a mobile device connection with the vehicle, the connection being to at least one of a simulated network connection or a simulated application connection, responsive to a stolen-vehicle trigger. The processor is also configured to gather predefined data from the mobile device, responsive to the mobile device accepting the offer and connecting to at least one of the simulated network connection or simulated application connection.

In a second illustrative embodiment, a system includes a vehicle memory and a processor configured to begin recording data in the vehicle memory, including at least media access control (MAC) addresses of every wireless network access point detected by a vehicle following a stolen-vehicle trigger, responsive to the stolen-vehicle trigger. The processor is also configured to upload the recorded data to a predefined recovery entity responsive to a connection between the processor and the predefined recovery entity being available to the processor.

In a third illustrative embodiment, a method includes determining at a vehicle that a vehicle-stolen trigger has been activated. The method also includes, responsive to the trigger being activated, simulate a network connection, via the vehicle, having a service set identifier (SSID) corresponding to a business name for a business determined to be within a predefined distance of a current vehicle location. The method further includes, responsive to a device requesting connection to the simulated network connection, recording predefined device identifying information received from the device as part of a connection request.

DETAILED DESCRIPTION

Figure 1:
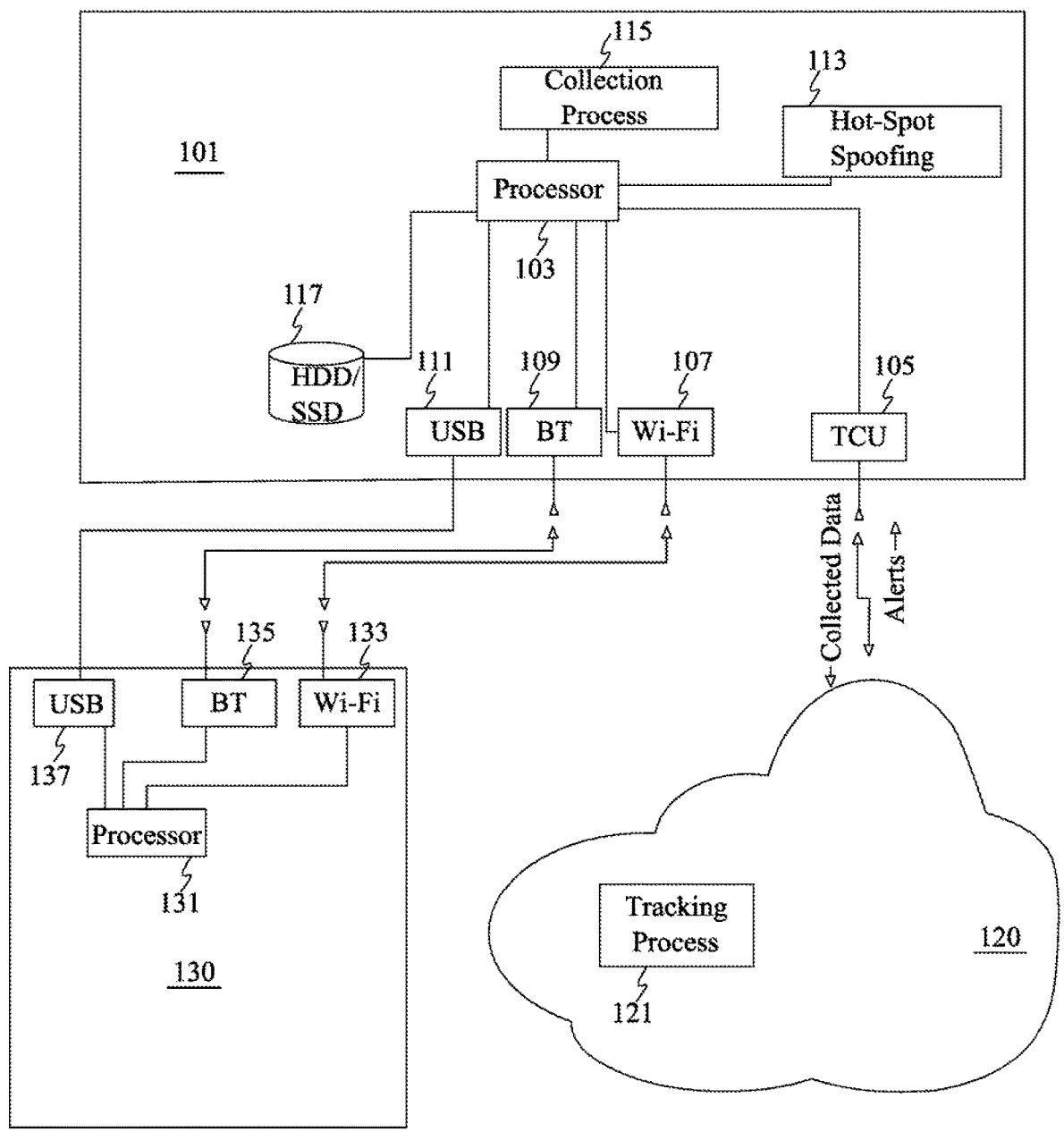
FIG. 1 shows an illustrative vehicle system usable in conjunction with the illustrative embodiments.

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

When a vehicle is stolen, it may be recovered at a later point, but unless the thief is caught at the time of recovery, identifying a thief may be difficult if the thief has wiped the vehicle of fingerprints and failed to leave behind any other evidence. This difficulty can be especially prevalent in cases where the vehicle was stolen for a joy-ride, where the thief takes the vehicle on a short drive, spends little time in the vehicle, and often leaves behind little evidence.

Even though the vehicle may have been recovered, law enforcement would still prefer to catch the thief, both to prosecute the thief for the crime and to prevent further such incidents. If there is nothing tangible to connect the thief to the vehicle, however, or if there are numerous fingerprints inside the vehicle from multiple permitted occupants, finding suitable evidence to identify the thief can be a difficult task.

Moreover, in the joy-ride scenario, the vehicle is often taken for such a short time period that an owner may not even realize the vehicle is stolen or may have only recently reported the vehicle as stolen before abandoning the vehicle. Onboard tracking may assist in determining where a vehicle is abandoned after such a ride, but the reaction time to the report of theft, if there even is such a report, may be too long to achieve successful capture of the thief at the location of abandonment.

The illustrative embodiments provide onboard tracking functions that can assist in determining who a thief is after the fact. By using data gathered by the vehicle systems, the police may be able to generally locate an area in which a thief used the vehicle or parked the vehicle, and, in some instances, may be able to identify a specific mobile device that was in the possession of an occupant of a stolen vehicle.

This atypical use of the vehicle technology allows for a unique form of data gathering to obtain data useful to identify a thief-location and possible identity. This can improve the ability of law enforcement to capture the thief following the theft and may discourage thieves from even attempting theft of vehicles that are known to be equipped with aspects of the illustrative embodiments.

The engagement of these functions can be based on vehicle alarm activation, vehicles being unexpectedly moved (outside traditional observed behavior patterns), vehicles crossing certain geo-fences into designated areas, a signal from a remote source to the vehicle or any other reasonable trigger. Since the vehicle is primarily gathering data, which can be safely warehoused in the vehicle or in a secure site until it is determined if the vehicle was actually stolen, there is little impact on a legitimate user if the vehicle accidentally gathers some data as described herein.

FIG. 1 shows an illustrative vehicle system 101 usable in conjunction with the illustrative embodiments. The illustrative vehicle 101 shown in FIG. 1 is representative of a vehicle computing system that may be installed in a variety of vehicles from an original equipment manufacturer (OEM). Much of the hardware used for data gathering may already exist in vehicles, but the proposed usages discussed herein differ from the functions for which that hardware is typically used.

The vehicle 101 may include a processor 103 that is capable of communicating with various vehicle 101 systems over a controller area network (CAN) bus. In this example, those systems may include, for example, a telematics control unit (TCU) 105 that is capable of providing cellular communication with a remote cloud 120 process 121. The cloud process 121 can act as a repository for gathered data and can relay the data to authorities or a vehicle owner, so that some real-time data reporting can occur. The cloud process 121 can also be used to send a notification to the vehicle 101 that the vehicle 101 has been stolen (e.g., following an owner report), which may trigger data tracking in some embodiments. The vehicle 101 can also connect to the cloud via Wi-Fi, as well as connecting to vehicle systems and other devices via ethernet connections.

The vehicle 101 may also include a Wi-Fi 107 and/or BLUETOOTH 109 transceiver, capable of communicating with a user device 130, which, in this example, would be a device 130 in possession of a thief or occupant in the vehicle 101 with the thief when the vehicle 101 is stolen. The vehicle 101 may further include a USB 111 or other direct connection, capable of wired communication with the device 130 if the device 130 is connected directly to the USB 111 connection.

Also, in this example, the vehicle 101 includes onboard memory 117 which includes, in this example, hard disk drive (HDD) storage, including various forms of persistent memory such as solid-state devices and other long-term storage. The vehicle 101 may also include one or more spoofing processes 113 that cause the processor 103 to fake an access application or access opportunity as discussed herein. The vehicle further includes a data collection process 115 that can be used in conjunction with the wireless 107, 109, and wired 111 connections, and the spoofing process 113 and the like, to gather data from a mobile device 130 that is connected to the vehicle 101. This data can later be used for identification of the vehicle location and/or a thief location or identity.

The vehicle 101 may also include a wireless charging option, which may further provide a communication channel over which data can be gathered by the vehicle 101 as this technology becomes more ubiquitous. Wireless charging protocols provide device and manufacturer IDs, among other things.

The illustrative embodiments discuss using the data in terms of identifying the thief after a vehicle 101 is recovered, but it will be appreciated that many of the embodiments can be used to also locate a vehicle 101, if offboard reporting of gathered data to the cloud 120 is available. If the thief is still in possession of the vehicle 101, identifying the thief will assist in finding the thief's location, which in turn can lead to the vehicle's location. Further, some of the data gathered can be used to directly identify a locality in which the vehicle 101 is located, even when a thief has not yet been identified.

Most people carry at least one wireless device 130 (e.g. a phone) in their possession, as this is the primary means of communication for a large portion of the population. Modern wireless devices 130 frequently include Wi-Fi 133 transceivers, BLUETOOTH 135 transceivers, and USB 137 (or a similar wired connection) connectivity for charging the device 130.

As shown in FIG. 1, USB 137, Wi-Fi 133 and BLUETOOTH 135 connections can all be used to connect to corresponding wireless communication connections on the vehicle 101. While a thief may not actually request such a connection explicitly, in the case of wireless connections, the thief may inadvertently allow the device 130 to connect if the processor 131 is configured to automatically connect to certain Wi-Fi connections and/or if the processor 131 is configured to automatically pair the BLUETOOTH to certain BLUETOOTH connections. The thief may also connect via a USB 137 cable that is currently in a vehicle 101, in order to charge a device 130, without considering the data-gathering opportunity such a connection may provide.

Figure 2:
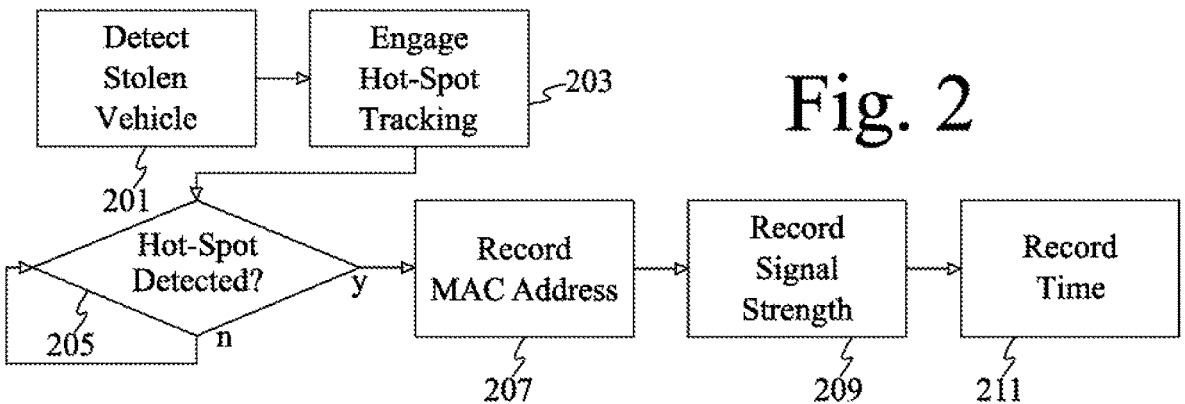
FIG. 2 shows an illustrative process for Wi-Fi hotspot tracking.

FIG. 2 shows an illustrative process for Wi-Fi hotspot tracking executable by, for example, a vehicle 101 processor 103. In this example, the vehicle 101 detects that it has been stolen at 201. This could include, for example, activation of an alarm system, determination that the vehicle 101 has been started when a key is not present, notification from the cloud 120 that the vehicle 101 was reported stolen, etc.

One of the processes that a vehicle 101 can launch to gather data is a hotspot address gathering process at 203. This involves communication between the vehicle 101 Wi-Fi transceiver 107 and does not necessarily require any interaction with a thief's device 120, rendering the process useful even if the thief is not in possession of a wireless device 120 from which data can be gathered.

In this example, the vehicle 101 can determine if and when it detects a hot-spot or other wireless device signals at 205. By identifying the hotspots in the vicinity of the vehicle 101, a sense of where the vehicle 101 was driven can be obtained. This can aid law enforcement in tracking down potential witnesses and, for example, if the same hotspots appear multiple times, may provide useful evidence about where the thief may frequently visit or even live. If the thief is foolish enough to have a hotspot enabled on their personal wireless device, the vehicle 101 may even record the evidence that the personal hot-spot was present for a long period of time as the vehicle 101 moved, generally indicating that the hot-spot was moving with the vehicle 101 (and thus likely in the possession of the thief).

In addition to recording the detection of various hot-spots, the vehicle 101 may also record the media access control address (MAC address) of a device at 207, which is a unique identifier assigned to a network controller (e.g., an access point or hot-spot). This unique identifier can be used by law enforcement to identify any recorded hot-spots or other network controllers, which, again, can be used to determine where the vehicle 101 was driven.

Also, the vehicle 101 may record a received signal strength at 209, which is the signal strength of the signal received from a given network controller whose MAC address was recorded at 207. This can be a useful indicator of how close the vehicle 101 is to the hot-spot (e.g., an in-vehicle hot-spot would likely have a much stronger signal than one in a building 50 feet away). By using relative signal strengths, law enforcement can derive a much clearer picture of the vehicle's relative position to each hot-spot, improving the granularity of a likely vehicle 101 travel path.

The vehicle 101 also records the time that the hot-spot or network controller was detected at 211. This timestamp is useful to determine when a vehicle 101 was near a given hot-spot, as well as determining whether the vehicle 101 revisited a hot-spot on multiple occasions. Both pieces of information are useful to law enforcement on a mission to track down a thief. The timestamp may also be useful if recorded in conjunction with, for example, a vehicle state event (e.g., fueling, door open, etc). This can allow the authorities to know what occurred in terms of state change and, with the timestamp and/or GPS, may lead to closed circuit television feeds that could be useful.

Figure 3:
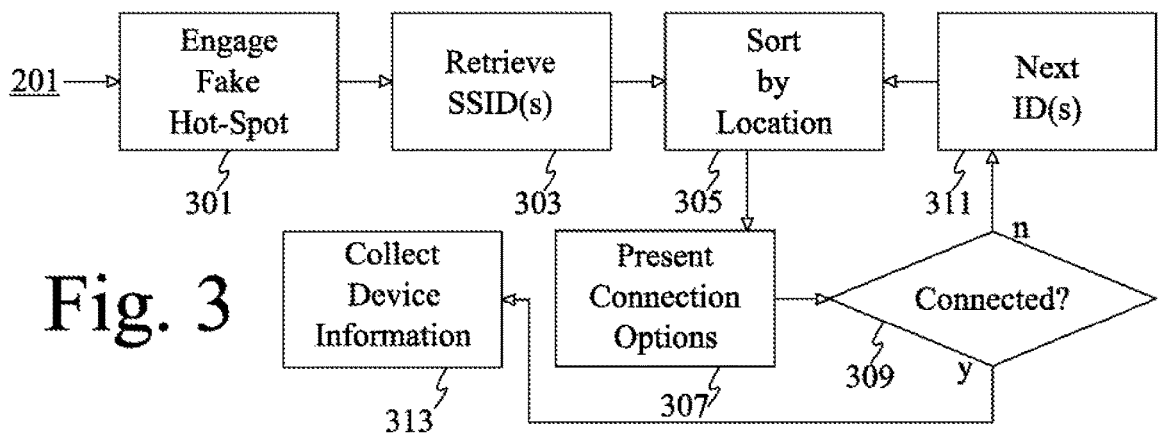
FIG. 3 shows an illustrative process for hotspot spoofing and data gathering.

FIG. 3 shows an illustrative process for hotspot spoofing and data gathering. This process is also executable by a vehicle 101 processor 103, and serves as bait to entice a thief to connect to a fake internet connection in order to attempt to gather information from the thief's personal device.

In this example, the vehicle 101 creates a fake hot-spot at 301. This is a signal advertising a hot-spot connection, for example, which is a real connection, but which will ultimately not result in an internet connection. If preferred, the vehicle 101 could create a real hot-spot opportunity, and either throttle the data connection or leave it truly open, depending on whether use of the vehicle owner's data allotment was a concern.

The thief's mobile device may discover the hot-spot and present an option to connect, or thieves may specifically direct their device to connect to the created hot-spot, in an attempt to, for example, use free data and/or enhanced navigation and other services facilitated by an internet connection.

In this example, the fake hot-spot advertises itself via a service set identifier (SSID) that appears to be from a local business or other reasonable locality that is not the vehicle itself. That is, even if a connection is real (depending on preference), the hot-spot may be advertising itself as a Big McFoody's hot-spot, not a vehicle hot-spot. This may further entice the thief to connect, when the thief does not believe that the vehicle will be involved in the connection.

Here, the vehicle 101 retrieves any number of usable SSIDs at 303. The vehicle 101 may have permission to use certain SSIDs by the owners of those respective businesses (e.g. a brand may grant permission in the interest of aiding law enforcement), or the vehicle 101 could use a slightly altered version of a brand name (e.g. Starbux, Starbuckz). In some instances, the vehicle 101 can retrieve a number of SSIDs that correspond to local businesses (e.g., within a 2 mile radius). The vehicle 101 can also dynamically generate these names based on map data, so the vehicle 101 could spin up a number of seemingly-real SSIDs based on where the vehicle 101 was located.

The vehicle 101 then sorts the SSIDs by location at 305, so that the vehicle 101 can present an SSID for a nearby or most-proximate business first at 307. This may give the thief increased confidence, if, for example, the thief can actually see the Big McFoody's restaurant when the option to connect is presented (even though the connection is being faked by the vehicle 101).

If the thief elects to connect at 309, the vehicle 101 can connect to the thief's device pursuant to a connection request from the device, and collect device information at 313. This can include any information normally transmitted in a handshake, as well as website requests, login data for sites, and any other data usable to identify the thief. Since the SSID is broadcast by the vehicle 101, this does run the risk of nearby other devices being connected by other users who are not actually the thief, so the vehicle 101 may be limited in what data it is legally permitted to collect.

If the vehicle 101 is moving, any users not present in the vehicle 101 will likely quickly drop off the connection, and law enforcement can easily sort out the accidental connections based on connection time and other factors indicating non-thieves. In still another example, the network could actually change SSIDs when too close to a business (within a real access point range of a legitimate network) to avoid users who are at the business from accidentally connecting to the fake vehicle hot-spot. If the thief does not connect, the vehicle 101 can wait and then present another SSID, which again will give the illusion that the connection opportunities are becoming available as the vehicle 101 travels into networks.

So, for example, in one instance the vehicle 101 may determine that there are four businesses, A, B, C and D, within a predefined distance (e.g., 1500 feet) and may offer sequential connection to simulated network connections having SSIDs named A, B, C, and D, or slight variants of those business names varied based on a predefined variance (fixed or formulaic, e.g. fixed being—business Alpha always=Alfa, or formulaic being—replace trailing "s" with "z"). The variants would be designed to be reasonable replicas of the business name, so that a thief would think that the variant on the name still probably was just a cleverly named version of the business's actual network.

In the sequential model, for example, the vehicle 101 could explicitly offer the network connection, e.g., "new hot-spot Business A detected, would you like to connect your device?" If the device is not actually connected to the vehicle 101, the user may still have to manually connect the device, and so in this instance the vehicle 101 is essentially informing the user about a connection that the vehicle 101 has just created to simulate a network connection for business A. If the mobile device is already connected to the vehicle 101, the vehicle 101 may be able to use user approval to further the connection process and gather additional information. Then, some period of time later, the vehicle 101 could offer connections to B, C and D, so that the connections, although simulated, look like they are appearing as the vehicle 101 travels closer to each business.

In an alternative model, the vehicle 101 can present the full list of A-D as a series of potential network connections. Or, in either model, the vehicle 101 could simply spin up and down a sequential series of connections or a full list of connections, so that the user using the mobile device would simply see the connections become available as an ordered series or a list. The user could then presumably instruct the mobile device to connect to any one of the apparently real hot-spot connections (the simulated connections).

Figure 4:
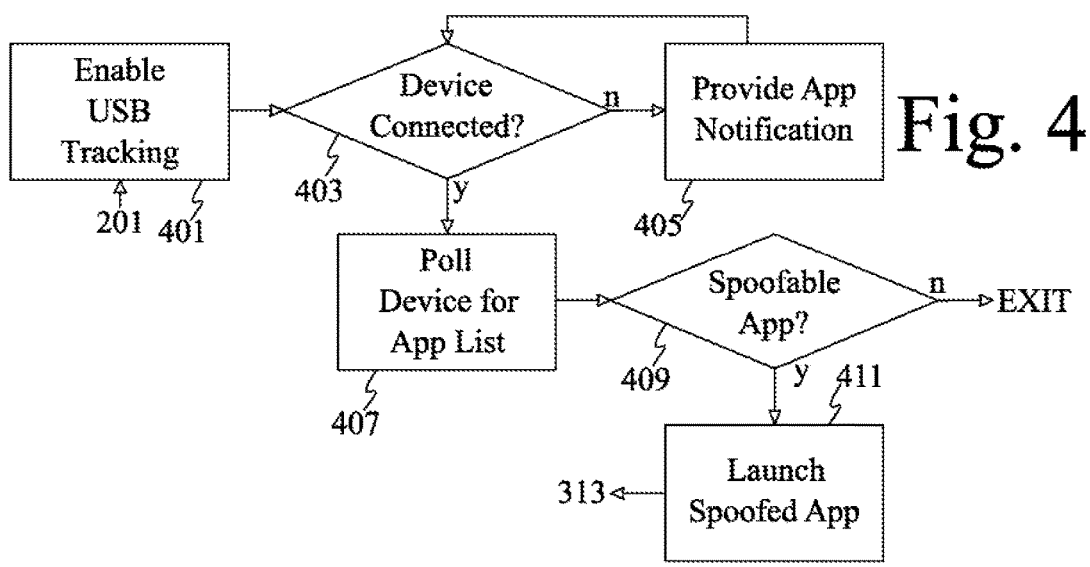
FIG. 4 shows an illustrative process for vehicle application spoofing and data gathering.

FIG. 4 shows an illustrative process for vehicle application spoofing and data gathering. In this illustrative example, also executable by, for example, a vehicle 101 processor 103, the vehicle 101 can provide spoofed versions of either common applications and/or certain applications residing on a thief's device. When the vehicle 101 is stolen, and the process is triggered based on conditions such as those previously suggested, and the like, the vehicle 101 can engage a USB connection tracking process at 401.

This process will attempt to gather information about any connected USB device. Since USB connections may not automatically allow the vehicle 101 to gather information about the device, but may require user permission, the vehicle 101 can entice a thief into granting access permissions by replicating, for example, a vehicle application known to allow phone-vehicle interaction. So, for example, the vehicle 101 could offer to play music from the device or offer any other reasonable-seeming connection offering that is actually the vehicle 101 opportunistically attempting to establish a connection over which data can be gathered. The vehicle 101 could also provide actual or replicated functionality of the application, so as not to arouse suspicion, but with a data gathering layer/application interposed between. The vehicle 101 can, for example, record a USB identifier of the device, pull all persistent data off of the phone via a command, and, if the device is authenticated/unlocked, pull additional data based on authentication.

The USB connection may allow for gathering of USB identification in some instances, which can be useful if the device is connected but only permitted to charge.

If the vehicle 101 detects that a device has already been USB connected at 403, the vehicle 101 can poll the device at 407 to determine if the device has any installed, replicable applications. These would be applications the vehicle 101 is configured to replicate, or, in another example, the vehicle 101 could potentially launch any compatible application but interpose a gateway, data-gathering application in-between the device and the onboard functionality of the actual application.

If the device includes an application that the vehicle 101 can replicate at 409, the vehicle can present an offer to the device to connect to a simulated version of the application at 411, or to connect to the application but through a gateway application that can gather data. The vehicle is not informing the device owner (the thief) that the fake or gateway application exists, so to the device owner the connection offer looks like a legitimate and common offer to use what is ostensibly a reasonable or familiar application.

If a device is not yet connected to USB at 403, the vehicle 101 can offer use of an application at 405 that is designed to entice the user to connect a device. This can be a music application or other application interfacing the device with the vehicle 101, and may just appear to be a relatively standard vehicle offering. If the user connects, then the application can proceed to data gathering such as described with respect to element 313 of FIG. 3.

Programming instructions for executing illustrative embodiments and the like may be executed by suitable processors, including, but not limited to, vehicle processors, cloud processing and/or mobile device processors, depending on the variation of the examples. Non-transitory storage media, such as, but not limited to, hard disk drives, solid state drives and other storage media used to store programming instructions, may store instructions allowing processors accessing that storage media to execute the instructions to perform the illustrative embodiments and the like.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor of a vehicle, configured to
responsive to a stolen-vehicle trigger, offer a mobile device connection with the vehicle, the connection being to at least one of a simulated network connection or a simulated application connection; and
responsive to the mobile device accepting the offer and connecting to at least one of the simulated network connection or simulated application connection, gather predefined data from the mobile device.

2. The system of claim 1, wherein the stolen-vehicle trigger includes activation of an alarm of the vehicle.

3. The system of claim 1, wherein the stolen-vehicle trigger includes detection by the processor of vehicle behavior predefined as atypical.

4. The system of claim 3, wherein the vehicle behavior includes the vehicle crossing a predefined geo-fence.

5. The system of claim 3, wherein the vehicle behavior includes operation of the vehicle during predefined time windows.

6. The system of claim 1, wherein the stolen-vehicle trigger includes detection by the processor of notification to the vehicle from a remote source indicating theft.

7. The system of claim 1, wherein the offer is for the simulated network connection to a network having a service set identifier (SSID) corresponding to a name of a business within a predefined distance of a location of the vehicle.

8. The system of claim 7, wherein the processor is configured to determine a plurality of businesses within the predefined distance, and offer the mobile device connections sequentially as individual offers to connect to a sequential series of simulated network connections in a sequence derived in a closest-first manner, such that successive offers are for simulated networks having SSIDs corresponding to businesses further in distance from the vehicle than preceding offers.

9. The system of claim 7, wherein the processor is configured to determine a plurality of businesses within the predefined distance, and offer the mobile device connections as an ordered list of selectable simulated network connections, each simulated selectable network connection on the list having an SSID corresponding to one of the plurality of businesses and each network connection displaying a simulated network strength based on a distance between the business to which a respective SSID corresponds and the vehicle location.

10. The system of claim 1, wherein the offer is for the simulated network connection to a network having a service set identifier (SSID) based on to a name of a business within a predefined distance of a location of the vehicle, the SSID modified in a predefined manner to produce a name different from the name of the business.

11. The system of claim 1, wherein the processor is further configured to poll the mobile device for a list of applications present on the mobile device, and wherein the offer is for the simulated application connection to an application existing on the list, presented as being executed by the vehicle.

12. The system of claim 1, wherein the offer is for the simulated application connection to one of a predefined list of vehicle-to-mobile-device applications.

13. The system of claim 12, wherein the simulated application connection is for an application existing on the vehicle, but wherein the processor is configured to interpose a data gathering process between the mobile device and the application to gather the predefined data, responsive to the mobile device being connected to the vehicle and prior to granting access to the application.

14. The system of claim 12, wherein the simulated application connection is for an application not installed on the vehicle, wherein the processor is configured to interpose a data gathering process to gather the predefined data, responsive to the mobile device being connected to the vehicle and to simulate predefined functionality of the application while the data gathering process is ongoing.

15. A system comprising:
a vehicle memory; and
a processor configured to
responsive to a stolen-vehicle trigger, begin recording data in the vehicle memory, including at least media access control (MAC) addresses of every wireless network access point detected by a vehicle following the stolen-vehicle trigger, and
upload the recorded data to a predefined recovery entity responsive to a connection between the processor and the predefined recovery entity being available to the processor.

16. The system of claim 15, wherein the processor is further configured to record a detected signal strength for each MAC address at periodic time intervals.

17. The system of claim 15, wherein the processor is further configured to record a duration of detection for each MAC address, representing the time from when the MAC address was detected to when the MAC address was no longer detected.

18. A method comprising:
determining at a vehicle that a vehicle-stolen trigger has been activated;
responsive to the trigger being activated, simulate a network connection, via the vehicle, having a service set identifier (SSID) corresponding to a business name for a business determined to be within a predefined distance of a current vehicle location; and
responsive to a device requesting connection to the simulated network connection, recording predefined device identifying information received from the device as part of a connection request.

19. The method of claim 18, further comprising:
responsive to the trigger being activated, simulate an application connection to an application offering to provide device-based functionality on the vehicle; and
responsive to a device requesting a second connection to the simulated application connection, recording predefined device identifying information received from the device as part of a second connection request.

20. The method of claim 18, further comprising:
responsive to the trigger being activated, recording data, including at least media access control (MAC) addresses and detected signal strengths at predefined time intervals, of every wireless network access point detected by the vehicle.

* * * * *